(12) United States Patent
Madnick

(10) Patent No.: US 8,464,650 B2
(45) Date of Patent: Jun. 18, 2013

(54) LOW-MAINTENANCE LAWN SEED MIXTURES AND USE THEREOF

(75) Inventor: B. Jackson Madnick, Wayland, MA (US)

(73) Assignee: Pearl's Premium, Inc., Wayland, MA (US)

( * ) Notice: Subject to any disclaimer, the term of this patent is extended or adjusted under 35 U.S.C. 154(b) by 0 days.

(21) Appl. No.: 13/203,585

(22) PCT Filed: Feb. 26, 2010

(86) PCT No.: PCT/US2010/000582
§ 371 (c)(1),
(2), (4) Date: Jan. 31, 2012

(87) PCT Pub. No.: WO2010/098870
PCT Pub. Date: Sep. 2, 2010

(65) Prior Publication Data
US 2012/0125243 A1    May 24, 2012

Related U.S. Application Data

(60) Provisional application No. 61/208,773, filed on Feb. 27, 2009.

(51) Int. Cl.
*A01C 21/00*    (2006.01)

(52) U.S. Cl.
USPC .......... 111/200; 111/900; 111/901; 800/298; 71/11; 428/35.2; Plt./388; Plt./393; 47/58.1 SE

(58) Field of Classification Search
USPC ............... 111/100, 200, 900, 901; 514/12, 514/12.1; 800/298; 71/11; 428/35.2; Plt./388, Plt./393; 47/58.1 SE, 58.1 R, 1.3, 14–16, 47/6, 7, 33, 89, 1.01 F
See application file for complete search history.

(56) References Cited

U.S. PATENT DOCUMENTS

2006/0241043 A1 * 10/2006 Flannagan et al. ............... 514/12

FOREIGN PATENT DOCUMENTS

| CN | 1328765 A | 2/2002 |
|---|---|---|
| JP | 04148618 A | 5/1992 |
| JP | 10276570 A | 10/1998 |
| JP | 2004305203 A | 11/2004 |

* cited by examiner

*Primary Examiner* — Christopher J Novosad
(74) *Attorney, Agent, or Firm* — Wolf, Greenfield & Sacks, P.C.

(57) ABSTRACT

The present invention is directed to turf grass seed mixtures for a low maintenance lawns and uses thereof. The lawn established from the specific seed varieties blended in certain proportions as described in the disclosure has a slow growth rate and deep roots and grows well in many regions across North America and elsewhere in the world. Because the lawn requires little watering or fertilizer and is hardy and naturally insect-tolerant, it is safe and environmentally friendly.

15 Claims, No Drawings

LOW-MAINTENANCE LAWN SEED MIXTURES AND USE THEREOF

RELATED APPLICATION

This Application claims the benefit under 35 U.S.C. 119(e) of U.S. Provisional Application 61/208,773, filed Feb. 27, 2009, the entire contents of which are incorporated herein by reference.

FIELD OF THE INVENTION

This invention relates to turf grass seed mixtures for a low-maintenance lawn.

BACKGROUND OF THE INVENTION

A staggering amount of chemicals including pesticides, herbicides and fertilizers are used every year on lawns, causing run-off and unnecessary health risks. Between 50% and 80% of lawn care chemicals run off lawns with the rain and into storm drains, ending up in the watershed or local ponds, lakes, streams and rivers. This causes algal blooms and feeds the invasive weeds out of control. In addition, many local communities use expensive herbicides in an effort to eliminate the invasive weeds in the ponds. Low levels of the fertilizer, pesticides and the herbicide may end up in local drinking water. Use of pesticides and fertilizer in urban and suburban communities contributes significantly to contamination of our drinking water and other surface water supplies. This also increases health risks to children, pets and the elderly and increases school department budgets from learning and behavioral disorders caused by the lawn care chemicals. Such use of chemicals applied to lawns adversely affects the entire community in many ways, increasing the risk to a wide range of public health problems, as well as incurring high costs of clean-up and dealing with invasive weeds.

Lawn care chemicals and pesticides get carried indoors into homes on shoes, pets and air currents. Once inside, pesticides linger in carpets, dust, on toys, and in the air we breathe. These chemicals normally break down outside over time with sunlight. However, away from sunlight and water, lawn chemicals and pesticides persist for many months, resulting in longer exposure to these chemicals indoors. According to health experts at the Massachusetts Department of Environmental Protection, prolonged exposure to the pesticides, herbicides and fertilizers in lawn care chemicals is responsible for an alarming increase in the risk of learning and behavioral disorders in children, and an increased risk for asthma, Parkinson's disease, cancer and a number of other ailments. The increased health risks are much higher for children, the elderly and our pets. According to Dr. Margo Roman, a veterinary expert, "50 years ago, only 5% of dogs got cancer. Today, over 46% of dogs get cancer and there is evidence suggesting this is caused by the widespread use of lawn care fertilizers, herbicides and pesticides." In response to these concerns, according to a report from the Organic Consumers Association "a new era" in pesticide use has begun in many cities around the globe, including all of Canada, New York City, San Francisco and many European cities, with the banning of many domestic products containing chemicals considered toxic to humans and the environment, including certain lawn-care chemicals.

Some estimates indicate that 30% of our county's precious potable water is consumed for lawn care uses. Lawn irrigation, particularly in-ground watering systems, increase summer water use to levels 3 to 5 times higher than winter water use. Use of nitrogen-rich chemical fertilizers and fast-growing, high-maintenance, shallow rooted grasses exacerbates the problem. Water shortages from your neighbors lawn care leads to increased water prices for everyone, water bans, and enforced conservation. Many of the non-native lawn seeds from Europe or Kentucky, with very shallow roots, are naturally adapted to environments that are wetter than ours. In New England, and most of North America, these foreign, shallow root, high maintenance grasses leads to an unnatural pattern of frequent watering and frequent mowing, particularly if chemical fertilizer is used.

Watering lawns with water that is filtered for human consumption and pumped to our homes wastes huge amounts of energy. Much of this lawn irrigation water evaporates and never returns to the underground water table. Producing commercial fertilizers from petroleum is energy intensive, and costs are rising as oil prices rise. Running a typical lawn mower for an hour is 11 times more polluting than running a mid size car full of people and luggage for an hour. So the energy intensive fertilizer, water from the town and lawn mower pollution in a standard lawn greatly increases your home and family carbon foot print. The May 2008 issue of "Health" Magazine had a story about the 12 most toxic things around your home environment, noting that a chemically-maintained lawn is the single most toxic thing inside or outside a home environment.

SUMMARY OF THE INVENTION

The invention provides seed mixtures that produce slow-growing grass and/or grass having longer roots than the roots of the individual seeds when grown alone or in different combinations. In some embodiments, a combination of slow growth of the grass shoots (e.g., grass blades) and long roots means that the lawn would need less water, less cutting and no chemical fertilizer. This also is useful to reduce health risks and run off of lawn-care-associated chemicals into ponds and drinking water. Over 1000 different mixtures that contained many different varieties of seeds (a mix of native and/or adaptive seed types) blended in different proportions (e.g., ratios) were tested. These mixtures were test-grown and evaluated for growth, aesthetics, adaptability, disease resistance, requirements for sun exposure, and hardiness for soil conditions such as clay content and pH, as well as tolerance for other environmental stress such as extremes of temperature, drought, insects, mold, road salt, wear, and overall low maintenance. As a result, proportions of these various seeds that create the unique and surprisingly superior properties of the lawn seed mixtures described herein were determined.

In one aspect the invention relates to lawn seed mixtures of defined species blended in premeasured proportions (e.g., ratios) as determined by dry weight.

In some embodiments, the premeasured lawn seed mixture comprises the following seeds: (a) Tall Fescue; (b) Perennial Ryegrass; (c) Kentucky Bluegrass; (d) Hard Fescue; and (e) Chewings Fescue, wherein the seeds are present in the mixture in about the following weight ratio: 1:1:1:1:1. In some embodiments, the seed mixture further comprises Creeping Red Fescue seed.

In some embodiments, the premeasured lawn seed mixture comprises following percentage ranges of seeds: (a) 18-22% Tall Fescue; (b) 18-22% Perennial Ryegrass; (c) 18-22% Kentucky Bluegrass; (d) 18-22% Hard Fescue; and (e) 18-22% Chewings Fescue. In some embodiments, the seeds are present within the following percentage ranges: (a) 19-21% Tall Fescue; (b) 19-21% Perennial Ryegrass; (c) 19-21% Kentucky Bluegrass; (d) 19-21% Hard Fescue; and (e) 19-21% Chewings Fescue. In some embodiments, the lawn seed mixture of claim 4, comprising about: (a) 19.75% Tall Fescue; (b) 19.75% Perennial Ryegrass; (c) 19.65% Kentucky Bluegrass; (d) 19.65% Hard Fescue; (e) 19.65% Chewings Fescue; (1) 1.47% inert matter; (g) 0.05% other crop seed; and (h) 0.03% weed seed.

In some embodiments, the premeasured lawn seed mixture comprises (a) Creeping Red Fescue; (b) Hard Fescue; (c) Chewings Fescue; and (d) Sheep Fescue, wherein the seeds are present in the mixture in about the following weight ratio: 5:2:1.5:1.5. In some embodiments, the lawn seed mixture further compres Fine Fescue seed. In some embodiments, the lawn seed mixture comprises two different varieties of Creeping Red Fescue contain about a 1:1 ratio of the two varieties.

In some embodiments, the premeasured lawn seed mixture comprising the following percentage ranges of seeds: (a) 45-55% Creeping Red Fescue; (b) 18-22% Hard Fescue; (c) 13.5-16.5% Chewings Fescue; and (d) 13.5-16.5% Sheep Fescue. In some embodiments, the premeasured lawn seed mixture comprises two different varieties of Creeping Red Fescue wherein each variety is present in a percentage range of 22.5-27.5%. In some embodiments, the lawn seed mixture wherein the seeds are present within the following percentage ranges: (a) 47.5-52.5% Creeping Red Fescue; (b) 19-21% Hard Fescue; (c) 14.25-15.75% Chewings Fescue; and (d) 14.25-15.75% Sheep Fescue. In some embodiments, the premeasured lawn seed mixture comprises two different varieties of Creeping Red Fescue wherein each variety is present in a percentage range of 23.75-26.25%. In some embodiments, the seed mixture comprises about: (a) 24.55% of a first variety of Creeping Red Fescue; (b) 24.55% of a second variety of Creeping Red Fescue; (c) 19.65% Hard Fescue; (d) 14.75% Chewings Fescue; (e) 14.75% Sheep Fescue; (f) 1.7% inert matter; (g) 0.05% other crop seed; and (h) 0.03% weed seed.

In any of the embodiments of the invention, the seed mixture may include at least one additional seed type.

In any of the embodiments of the invention, the seed mixture may be contained in a bag.

In any of the embodiments of the invention, the seed mixture may further comprise an organic fertilizer.

In any of the embodiments of the invention, the seed mixture may further comprise composting material.

In any of the embodiments of the invention, the seed mixture may further comprise soil.

In another aspect, the invention provides a method for producing one or more lawn seed mixtures, which involves selecting suitable species of defined seed varieties, measuring each component (e.g., dry, pure seeds) and/or blending them so as to obtain a mixture of lawn seeds in defined proportions. Thus, embodiments of the invention also include the lawn seed mixtures obtained by the process of blending (e.g., mixing) the dry seed varieties as described herein. In some embodiments, aspects of the invention relate to a method of seeding a seed mixture as described herein in order to generate a lawn. In some embodiments, aspects of the invention relate to lawns produced using one or more seed mixtures of described herein.

A further aspect of the invention is drawn to methods for obtaining a low maintenance lawn.

In some embodiments, the method for increasing resistance of a lawn to drought comprises planting a lawn seed mixture according to any embodiments of the lawn seed mixtures described herein.

In some embodiments, the method for increasing resistance of a lawn to flooding comprises planting a lawn seed mixture according to any embodiments of the lawn seed mixtures described herein.

In some embodiments, the method for increasing resistance of a lawn to heat comprises planting a lawn seed mixture according to any embodiments of the lawn seed mixtures described herein.

In some embodiments, the method for increasing resistance of a lawn to sun comprises planting a lawn seed mixture according to any embodiments of the lawn seed mixtures described herein.

In some embodiments, the method for increasing resistance of a lawn to shade comprises planting a lawn seed mixture according to any embodiments of the lawn seed mixtures described herein.

In some embodiments, the method for increasing resistance of a lawn to salt comprises planting a lawn seed mixture according to any embodiments of the lawn seed mixtures described herein.

In some embodiments, the method for increasing resistance of a lawn to insects comprises planting a lawn seed mixture according to any embodiments of the lawn seed mixtures described herein.

In some embodiments, the method for enhancing root growth of a lawn comprises planting a lawn seed mixture according to any embodiments of the lawn seed mixtures described herein.

In some embodiments, the method for reducing lawn care comprises planting a lawn seed mixture according to any embodiments of the lawn seed mixtures described herein. In some embodiments, the lawn care comprises a chemical applied to the lawn, including a chemical fertilizer and/or a chemical pesticide or insecticide. In some embodiments, the lawn care comprises watering and/or mowing.

In a related aspect, the invention provides use of the lawn seed mixtures provided herein for obtaining a low maintenance lawn.

In some embodiments, any embodiments of the lawn seed mixtures included herein may be used for increasing resistance of a lawn to drought.

In some embodiments, any embodiments of the lawn seed mixtures included herein may be used for increasing resistance of a lawn to flooding.

In some embodiments, In some embodiments, any embodiments of the lawn seed mixtures included herein may be used for increasing resistance of a lawn to heat.

In some embodiments, any embodiments of the lawn seed mixtures included herein may be used for increasing resistance of a lawn to sun.

In some embodiments, any embodiments of the lawn seed mixtures included herein may be used for increasing resistance of a lawn to shade.

In some embodiments, any embodiments of the lawn seed mixtures included herein may be used for increasing resistance of a lawn to salt.

In some embodiments, any embodiments of the lawn seed mixtures included herein may be used for increasing resistance of a lawn to insects.

In some embodiments, any embodiments of the lawn seed mixtures included herein may be used for enhancing root growth of a lawn.

In one aspect the invention relates to lawn seed mixtures of defined species blended in premeasured proportions (e.g., ratios) as determined by dry weight.

DETAILED DESCRIPTION OF THE INVENTION

Provided herein are lawn seed mixtures (e.g., turf grass mixtures) for a versatile, ultra low maintenance lawn that is beneficial for one or more reasons described herein. The lawn described herein requires less mowing, little or no watering or chemical fertilizer, deter insects such as mosquitoes, and grows well under various conditions.

In some embodiments, aspects of the invention relate to mixtures of grass seeds that produce turf grasses with one or more unexpected properties. Mixtures described herein, when compared to many hundreds of other tests, grew slower and produced deeper roots and needed less water. In some embodiments, certain combinations of seeds produce grass that stays green/er throughout the later summer heat, late fall cold, and winter, before and after the snow, when other lawns go dormant and brown in color from the cold. In some embodiments, a seed that has a naturally occurring beneficial fungus (an endophytes) also may be included with the seed mixtures. Endophytes live synergistically off certain grass plants. The fungus produces defensive compounds (alkaloids) that are detrimental to grass feeding insects and lessen bugs that attack to the grass and lessen grubs. Endophytes lessen the need for chemicals and pesticides. Surprisingly, in some embodiments certain mixtures that support endophytes produce grass that deters mosquitoes. Examples of seed varieties known to contain endophytes include but are not limited to: Tall Fescues, Perennial Ryegrasses, Hard Fescues, Chewings Fescues, and Creeping Red Fescues.

In some embodiments, lawn seed mixtures disclosed herein are characterized by their extremely slow rate of growth and extensive root systems, as well as their ability to grow under a wide range of climate (e.g., temperature, sun exposure, moisture levels, etc.) and soil conditions. The lawn seed mixtures of the invention grow about one fourth the rate of typical blue grass. Because the grass shoots grow slowly, it requires less cutting or mowing. For example, as compared to typical turf grass, such as blue grass, which requires mowing about once a week during the height of the summer, a lawn established from the seed mixtures described in the present invention requires mowing about once a month with typical summer precipitation.

In some embodiments, the lawn seed mixtures described herein have been shown to establish extremely deep roots. As compared to typical turf grass with roots of about 2-6 inches long, seed mixtures described herein grow roots that are longer than 6 inches when cut to about 3-4 inches high. In some embodiments, the roots of the resulting turf grass grow to at least 6 inches, at least 8 inches, at least 10 inches, or at least 12 inches in length (e.g., after 2 growth seasons or one year). In some embodiments, the roots grow to about 12 inches in length, sometimes reaching about 14 inches in length. This means that the grass can access moisture deep in the soil, requiring less, or in some cases no, watering of the lawn once established, particularly in Northern U.S. climates. In warmer climates, a lawn obtained from the lawn seed mixture of the invention may need supplemental watering but far less than standard bluegrass lawns do. Moreover, due in part to these extensive root systems and very slow growth, the lawn requires no chemical fertilizer and little or no organic fertilizer. Thus, the seed mixtures of the invention provide a low maintenance lawn that is also environmentally friendly, e.g., people, pet and planet friendly. While it is generally recommended to have organic compost once a year to supplement with extra nutrients for the lawn, to lessen weeds and grubs, to aerate the soil, and to introduce microbial activity to the soil, tests have shown that the lawn grows well even in the absence of an added fertilizer. It should be appreciated that the length of the roots may be measured as the average root length of the turf grass once it is established (e.g., after, 2 seasons of growth or one year).

Lawn Seed Mixtures

As described in more detail herein, specific varieties of seed types in specific proportions were carefully selected to achieve superior growth of low maintenance lawn, including areas that are predominantly in the sun, shade and deep shade. Two primary classes of lawn seed mixtures have been developed, each custom-blended for different amounts of sun. Lawn seed mixtures that are particularly suited for areas more sunny than shady are referred to as sunny mixtures, or Sunny Mix, while lawn seed mixtures that are particularly suited for areas more shady than sunny are referred to as shady mixtures or Shady Mix.

In some embodiments, aspects of the invention provide a lawn seed mixture that particularly thrives in relatively sunny conditions (sunny mixtures). In certain embodiments, the sunny mixture contains the following five types of grass seed: Tall Fescue (*Festuca arundinacea*), Perennial Ryegrass (*Lolium perenne*), Kentucky Bluegrass (*Poa pratensis*), Hard Fescue (*Festuca longifolia*) and Chewings Fescue (*Festuca rubra commutata*). In some embodiments, the sunny mix contains the five varieties of seeds mixed approximately in equal portions. Thus, in some embodiments, each of the five varieties are premeasured to constitute about 20% of the total seeds in a sunny mixture. Table 1 illustrates examples of the relative % weight of each seed in a seed mixture.

TABLE 1

| Seed | Percent | Range 1 | Range 2 | Range 3 |
| --- | --- | --- | --- | --- |
| Tall Fescue | About 20% | 15-25% | 18-22% | 19-21% |
| Perennial Ryegrass | About 20% | 15-25% | 18-22% | 19-21% |
| Kentucky Bluegrass | About 20% | 15-25% | 18-22% | 19-21% |
| Hard Fescue | About 20% | 15-25% | 18-22% | 19-21% |
| Chewings Fescue | About 20% | 15-25% | 18-22% | 19-21% |

It should be appreciated that additional material also may be included in the seed mixture. In some embodiments, the additional material is inert matter and/or other contaminant seeds (e.g., other crops or weeds). In some embodiments, one or more additional grass seeds also may be included for other benefits (e.g., salt tolerance, insect deterrence, higher wear characteristics, etc., or any combination thereof). However, the advantageous properties of the seed mixture may be maintained provided that the five seed varieties are maintained in the same relative ratios as listed in Table 1. Accordingly, in some embodiments, the percentages listed in Table 1 represent the percent of the total weight of the seed mixture. However, in some embodiments, the seed mixture contains additional components and the percentages listed in Table 1 represent the relative ratios of the five seeds listed in Table 1. In some embodiments, a seed mixture also may be supplanted with a fertilizer (e.g., an organic fertilizer), a compost material, soil, or any combination thereof. For example, in some embodiments, a seed mixture may contain the following percentages shown in Table 2.

TABLE 2

| Seed or other material | Example 1 |
| --- | --- |
| Tall Fescue | 19.75% |
| Perennial Ryegrass | 19.75% |
| Kentucky Bluegrass | 19.65% |
| Hard Fescue | 19.65% |
| Chewings Fescue | 19.65% |
| Inert Matter | 1.47% |
| Other Crop Seed | 0.05% |
| Weed Seed | 0.03% |

In some embodiments, the relative proportions of the seed varieties may be adjusted. However, testing of over 500 different mixtures showed that if the relative proportions are adjusted by more than 10% (e.g., up or down), the surprising shoot and/or root growth properties described herein are reduced. Accordingly, in some embodiments, the relative proportions of the five varieties listed in Tables 1 and 2 may be increased or decreased by about 5-15% (e.g., +/−5% to 15% of the fraction of the component in the mixture), for example, by about 5%, by about 6%, by about 7%, by about 8%, by about 9%, by about 10%, by about 11%, by about 12% by about 13%, by about 14% or by about 15%. As an example, in a seed mixture that comprises 20% Tall Fescue, this may be modified (adjusted) by about 5-15% in either direction, e.g., 5% of the 20% is 1% and 15% of the 20% is 3%, therefore the 20% contents of Tall Fescue may be adjusted to between 19% and 21% of the mixture where a small change is being made, and between 17% and 23% where a greater change is being made. However, in some embodiments, the seed percentage in a mixture may be increased or decreased by 1-10% (e.g., by 1-5%, 5-10%, about 1%, about 2%, about 3%, about 4%, about 5%, about 6%, about 7%, about 8%, about 9%, or about 10%) of the total mixture of the seeds of interest (e.g., of the 5 seeds described in illustrated in Tables 1 and 2).

In some embodiments, a higher content of a tall fescue, coupled with the addition of a creeping red fescue, can render these sunny mixtures more tolerant to summer heat and sun. The following blend of seeds represents a non-limiting embodiment of a sunny mix, which is suitable for generally sunny locations, such as areas of land with approximately 50% to full sun. This is particularly adjusted for areas with more intense summer heat.

TABLE 3

| Seed | % seed |
| --- | --- |
| Tall Fescue | About 25% |
| Perennial Ryegrass | About 18% |
| Kentucky Bluegrass | About 17% |
| Hard Fescue | About 15% |
| Creeping Red Fescue | About 13% |
| Chewings Fescue | About 12% |

It should be appreciated, that different varieties of these seeds may be used.

According to aspects of the invention, the "Sunny Mix" is preferred for areas with full sun down to 50% sun per day, and the "Shady Mix" is preferred for areas with 50 percent sun or partial to full shade. Extensive experimentation indicates that the lawn seed mixtures comprising the specific seed varieties mixed in the specific proportions will grow well almost anywhere. The "original" Sunny Mix and "original" Shady Mix described in Examples 1 and 3 grow well in most areas, unless the soil stays wet all the time or does not drain.

The original lawn seed mixtures were developed in New England, using native and adaptive grass varieties. However, these lawn seed mixtures can grow well in a wide range of climate conditions and temperature zones (including a range of temperature zones in the United States and Canada). These include zones 2 to 8a (e.g., 2b to 7b). For example, the "original" Sunny Mix shown in Example 1 below grows well in temperate areas that are moderate to cold. As a general guideline, if a line is drawn in a map between Maryland across the country to mid California, everything above that line, up to mid Canada would fall within these regions. Generally, the original Sunny Mix does not thrive in the Deep South, Texas and Southern California, where the temperatures during summer tend to be extremely high. However, the mixtures still grow under these conditions and may maintain certain advantages described herein if supplemental water is provided.

Notwithstanding, the original Sunny Mix has been successfully planted in some areas in the deep south, although establishing the lawn may require a little extra care up front. For example, the grass may be established under challenging conditions by planting in the fall as soon as soil temperatures are down to 70 degrees F. to get the roots as deep as possible before summer heat, followed by watering deeply with an inch of water once or twice a week in the warmer months, and watering in early mornings. In a southern climate, aeration and top spreading ¼ inch of organic compost helps aerate the soil to achieve the deepest roots.

A "second generation" Sunny Mix has been developed, which is better suited for these regions with hot climate. The addition of higher contents of a tall fescue species in these mixtures helps the lawn to stay greener. The lawn needs less fertilizer and can be cut higher and withstands more intense summer heat. Moreover, a creeping red fescue species was added, which makes the lawn more heat-tolerant. An exemplary seed mixture is provided in Example 2.

In some embodiments, a shady mixture may be used for establishing a lawn in mostly shady areas such as areas that are blocked by structures (e.g., buildings or trees), including under large trees like maple and pine trees. Shady mixtures are specifically blended to grow well with limited sun exposure. In some embodiments, shady mixtures comprise the following seed types: a first variety of Creeping Red Fescue (*Festuca rubra*); a second variety of Creeping Red Fescue (*Festuca rubra*); Hard Fescue (*Festuca longifolia*); Chewings Fescue (*Festuca rubra commutata*); and Sheep Fescue (*Festuca ovina*).

In some embodiments, each of the five varieties are pre-measured to constitute about the percentages of the total seeds in a shady mixture described herein. Table 4 illustrates examples of the relative % weight of each seed in a shady seed mixture.

TABLE 4

| Seed | Percent | Range 1 | Range 2 |
| --- | --- | --- | --- |
| Creeping Red Fescue (first variety) | About 25% | 22.5-27.5% | 23.75-26.25% |
| Creeping Red Fescue (second variety) | About 25% | 22.5-27.5% | 23.75-26.25% |
| Hard Fescue | About 20% | 18-22% | 19-21% |
| Chewings Fescue | About 15% | 13.5-16.5% | 14.25-15.75% |
| Sheep Fescue | About 15% | 13.5-16.5% | 14.25-15.75% |

It should be appreciated that in some embodiments, two or more different types of Creeping Red Fescues may be used so that together they total about 50% of the mixture. For example, Eugene Creeping Red Fescue, Weston Creeping Red Fescue and/or Boreal Creeping Red Fescue may be used in combination. In some embodiments, about one to one ratio of the two creeping red fescues are used in combination for the mixture. One such example is to use about 25% each of Eugene Creeping Red Fescue and Weston Creeping Red Fescue in the mixture. Without being bound by any particular theory, it is believed that the use of more than one variety of Creeping Red Fescue helps increase chance of overall successful growth where at least one variety that is better suited for a particular environment is able to thrive.

As described herein, it should be appreciated that additional material also may be included in the seed mixture. In some embodiments, the additional material may be inert matter and/or other contaminant seeds (e.g., other crop seeds or weed seeds). In some embodiments, one or more additional grass seeds also may be included for other benefits (e.g., salt tolerance, insect deterrence, heat tolerance, etc., or any combination thereof). However, the advantageous properties of the seed mixture may be maintained provided that the five seed varieties are maintained in the same relative ratios as listed in Table 4. Accordingly, in some embodiments, the percentages listed in Table 4 represent the percent of the total weight of the seed mixture. However, in some embodiments, the seed mixture contains additional components and the percentages listed in Table 4 represent the relative ratios of the five seeds listed in Table 4. For example, in some embodiments, a seed mixture may contain the following percentages shown in Table 5.

TABLE 5

| Seed or other material | Example 1 |
|---|---|
| First Variety of Creeping Red Fescue | 24.55% |
| Second Variety of Creeping Red Fescue | 24.55% |
| Hard Fescue | 19.65% |
| Chewings Fescue | 14.75% |
| Sheep Fescue | 14.75% |
| Inert Matter | 1.7% |
| Other Crop Seed | 0.05% |
| Weed Seed | 0.03% |

In some embodiments, the relative proportions of the seed varieties may be adjusted. However, testing of about 1,000 different mixtures showed that if the relative proportions are adjusted by more than 10% (e.g., up or down), the surprising shoot and/or root growth properties described herein are reduced. Accordingly, in some embodiments, the relative proportions of the five varieties listed in Tables 4 and 5 may be increased or decreased by 1-10%, or by about 1%, by about 2%, by about 3%, by about 4%, by about 5%, by about 6%, by about 7%, by about 8%, by about 9%, or by about 10%.

In some embodiments, the relative proportions of the five varieties listed in Tables 4 and 5 may be increased or decreased by about 5-15% (e.g., +/−5% to 15% of the fraction of the component in the mixture), for example, by about 5%, by about 6%, by about 7%, by about 8%, by about 9%, by about 10%, by about 11%, by about 12% by about 13%, by about 14% or by about 15%. As an example, in a seed mixture that comprises 20% Hard Fescue, this may be modified (adjusted) by about 5-15% in either direction, e.g., 5% of the 20% is 1% and 15% of the 20% is 3%, therefore the 20% contents of Hard Fescue may be adjusted to between 19% and 21% of the mixture where a small change is being made, and between 17% and 23% where a greater change is being made. However, in some embodiments, the seed percentage in a mixture may be increased or decreased by 1-10% (e.g., by 1-5%, 5-10%, about 1%, about 2%, about 3%, about 4%, about 5%, about 6%, about 7%, about 8%, about 9%, or about 10%) of the total mixture of the seeds of interest (e.g., of the 5 seeds described in illustrated in Tables 4 and 5).

An exemplary embodiment of a Shady Mix is provided in Example 3.

In some embodiments, a shady seed mixture is established more effectively in areas such as under trees, when it is watered for a longer period during the establishing period, and during the summer of the first year, because the grass has to compete with the tree leaves and the tree roots for water in order to get established. By the next summer, the lawn will be thriving in the shady area, including under the tree.

For establishing a green lawn in a relatively heavier traffic area and/or an area with wetter conditions, a "second generation" shady mixture may be used. The original mixtures described herein are good for light to medium traffic and abuse, which include children and dogs playing on it over a wide area, as well as for a town green or general town landscaping needs or for the front or back lawn of a residential home. However, the "original" seed mixtures are not as well suited to intense use, for example on a baseball or soccer field. Thus, "second generation" shady mixtures have been developed for slightly higher intensity low maintenance use.

Table 6 illustrate a non-limiting embodiment of a seed blend that is suited for fully shady locations as well as part-sun locations (e.g., up to about 50% sun). This mixture is particularly suitable for sub-optimal soil conditions, warm climate and/or areas susceptible for heavy wear.

TABLE 6

| Seed | Percent |
|---|---|
| Eugene Creeping Red Fescue | About 22-25% |
| Harpoon Hard Fescue | About 22-25% |
| Weston Creeping Red Rescue | About 18-22% |
| Sheep Fescue | About 14-16% |
| Carmen Chewings Fescue | About 10-12% |
| Other Fine Fescue(s) | About 4-7% |

A non-limiting example of a second generation Shady Mix is provided in Example 4 below.

Often a lawn contains areas of varying degrees of sun exposure. That is, some areas of the lawn receive more sun light than other areas. In these cases, therefore, certain areas of the lawn with greater sun exposure may call for a Sunny Mix, while other areas of the lawn with less sun may call for a Shady Mix. In some embodiments, the colors of the Sunny Mix lawn and the Shady Mix lawn are designed to blend, and any difference in the colors will not be noticeable. However, it is recommended that both seed mixtures overlap a little to make the transition smoother. In some cases, two or more seed mixtures may be blended together and spread everywhere, and the appropriate seed will thrive overtime for the right light level.

The lawn seed mixtures described in the present application generally grow well in a variety of soil conditions. A number of factors contribute to the conditions of soil, including but not limited to pH and salt, compaction, clay content, sand content and mineral contents, etc. The ability of plant roots to take up water and nutrients depends on the relative alkalinity or acidity of the soil. Most plants prefer a soil close to neutral (pH 7), and most turf grass species prefer slightly acidic conditions, such as in a pH 6.5-7.0 range. However, the lawn seed mixtures of the present invention can grow in a broader range of soil pH, making it suitable even for soils that are not typically optimal for establishing turf.

Moreover, the lawn seed mixtures described herein grow well in a variety of soil types, including partially sandy soil. Soil type usually refers to the different sizes of mineral particles in a particular sample. Soil is made up in part of finely ground rock particles, grouped according to size as sand, silt and clay. Each size plays a significantly different role.

In addition to the mineral composition of soil, humus (organic material) also plays a crucial role in soil characteristics and fertility for plant life. The lawn seed mixtures of the invention can establish extremely deep roots, which can absorb sufficient amounts of nutrients from the soil even where the soil is not particularly rich in organic material.

In some embodiments, the seed mixtures described herein may refer to dry seeds of significant purity, or blends thereof, which meet the USDA guidelines. As used herein, the term "premeasured" or "premeasured" means that particular constituents (e.g., seed varieties) of a total mixture are blended in a specific proportions determined by weight. This does not, however, preclude that in most cases the mixture contains impurity from some or all of the seed varieties used as a source. For example, most "pure" seeds will still contain a small amount of inert matter or other seeds such as crop seeds and weed seeds. However, in some embodiments, such impurities present in the mixture should not exceed 5% of the total mixture. In certain embodiments, impurities are below 2% of the total mixture.

In some embodiments, the seed mixtures also may contain a small amount of inert matter as well as small amounts of other crop seeds and weed seed which are contaminants. However, in some embodiments the inert matter and other seeds do not exceed 5% of the total mixture. In certain embodiments, the inert matter and other seeds in the mixture constitutes 2% or less.

In some embodiments, it may be desirable to ensure that each of the seed varieties used to formulate the lawn seed mix is of high quality. This may be assessed by determining germination probability (e.g., rates) of the seeds. Generally, the higher the germination probability, the better the general quality. For example, in some embodiments, each variety to be used for formulating the seed mixture as described herein has a minimum of 85% germination rate. In certain embodiments, each variety has germination of about 86%, 87%, 88%, 89%, 90%, 91%, 92% or higher.

Permissive Seed Varieties

Tall fescue (*Fescue arundinacea*) is a perennial bunch-type grass that grows rapidly during spring and fall. Because of its bunch-type growth, if used alone or in other blends available in the market, spring pre emergence organic herbicides generally are recommended or the grass seeds planted densely to block light at the soil to keep a lawn relatively free of weeds. However, when blended together with the other varieties in the proportions according to the present invention, such use of herbicides is significantly reduced or not necessary at all. Furthermore, tall fescues are generally not recommended to mix with bluegrass as the bunching characteristics will create unsightly patches. This is also remedied by the particular mixtures of lawn seeds described herein. Generally, Tall fescues are more drought resistant that many other lawn grasses such as bluegrass or perennial ryegrass. Fescue roots tend to penetrate deeper into the soil. In addition, Tall fescues are more disease resistant and wear tolerant, making them ideal for heaver foot traffic areas and lighter-use athletic fields. Like bluegrass, they are considered a cool season grass, remaining green for a longer duration out of the year. The seed mixtures described herein retain these desirable tall fescue characteristics while also producing grass with surprisingly long roots and/or that is surprisingly low maintenance. While Dakota Tall Fescue may be used for these mixtures, it is also possible to substitute with another type of tall fescue with similar characteristics without altering the proportions of the mixture. Examples of tall fescues that may be useful for the invention include but are not limited to: Dakota Tall Fescue, Taos Tall Fescue, Tombstone Tall Fescue, Black Magic Tall Fescue, Black Tombstone Tall Fescue, Greystone Fescue, Georgia 51 Fescue, Kentucky 31, Matador Tall, Rebel IV Fescue (available from Pennington Seed Inc.), Tar Heel II Fescue and Titan LTD Fescue, Sitka (available from Columbia Seed LLC), Ultimate (available from Lewis Seed Company), Innovator (available from Scottsturf-Seed). Barvado (available from Barenbrug), Arid 3 (available from Jacklin Seed by Simplot®), Hunter (available from Lesco), Six Point and Scorpion II (available from Proseeds Marketing, Inc.). Montana Tall Fescue Tonto Tall Fescue, Dorado Tall Fescue, Golconda Tall Fescue, Perennial Ryegrass (*Lolium perenne*) is a fine-textured, tough grass that is deep green in color. It can grow well in various different soils and is often mixed with other grasses such as Kentucky Bluegrass to help provide increased durability and faster growth. Perennial Ryegrasses tend to do best in areas with mildly-cool climates and damp summer conditions in the coastal west and northwest regions of the U.S. and Canada. Grown alone or blended in with other grass types previously available in the market, Perennial Ryegrass typically germinates and grows quickly and relatively durable. However, it generally has a low tolerance to drought and cold and has only moderate shade tolerance. In some cases, Perennial Ryegrass is known to "crowd out" and delay growth of other grasses if seeded over them. Examples of Perennial Ryegrass varieties useful for the invention include, without limitation: Frontier Perennial Ryegrass (Jonathan Green & Cascade International Seed Company), Darkstar II Perennial Ryegrass and Yorkshire Dales Perennial Ryegrass. Other branded varieties include: Phenom (available from Ampac Seed Company), Primary, Palace, Presidio, Playoff and Priority (all available from Columbia Seed LLC), All*Star 3, Derby Xtreme, Keystone 2 and Regal 5 (all available from DLF International Seeds), Exacta II GLSR, Charismatic II GLSR and Secretariat II GLSR (all available from Lebanon Turf Products), Notable, Prototype, Attribute and Wayfarer (all available from Lesco), Homerun (available from Mountain View Seeds), Apple GL (available from ZSeeds LLC/ Mountain View Seeds), IG2, Applaud 2, Integra 2, Wind Dance 2 (all available from Pennington Seeds Inc.), Palmer V and Prelude GLS (both available from Proseeds Marketing, Inc.), Showtime and Quickstart II (both available from Scottsturf-Seed) and Singular Perennial Ryegrass.

Kentucky bluegrass (*Poa pratensis*) typically grows 18 to 24 inches tall when planted alone and is readily identified by its boat-shaped leaf tip. It spreads by rhizomes and tillers and forms a dense sod. Over 100 cultivars (varieties) of Kentucky bluegrass have been developed during the past 25 years. Some branded varieties tolerate southern climates better than others (Adelphi, Baron, Fylking, Glade, Midnight, Ram I, Vantage, Victa and Warrens A-34), some have moderate shade tolerance (Bristol, Glade, Nugget and Touchdown), and some tolerate closer mowing (Adelphi, Bristol, Ram I and Touchdown). Typically, a blend of about 3 varieties of bluegrasses are selected for planting in the transition zone to increase opportunity for success. Examples of Kentucky bluegrass varieties useful for the invention include, without limitation: Deepblue Kentucky Bluegrass, Blue-Tastic Kentucky Bluegrass, Blue Sapphire Kentucky Bluegrass, and Washington Kentucky Bluegrass. Other branded varieties include: Comrade (available from Ampac Seed Company), Barimpala (available from Barenbrug), Everest and Tsunami (both available from Jacklin Seed by Simplon, Blue-Tastic and Golden Nugget (both available from Jonathan Green & Cascade International Seed Company), Zinfandel (available from Lebanon Turf Products), P-707 (available from Pennington Seed Inc.), Hunnington and Mystere (both available from Proseed Marketing Inc.), Prosperity and Voyager II (both available from Scottsturf-Seed), Argos, Ulysses and Rampart (all available from See Research of Oregon) and Madison Kentucky Bluegrass.

Creeping Red Fescue (Festuca rubra) is a perennial with short rootstalks and few to many stems that are usually reddish at the base and 6 to 36 inches high, with smooth leaves and sheaths. The leaves are enfolding and narrow, more or less hairy, and shorter than the stems. Its seedhead is a dark green, reddish, or waxy cluster, 2 to 5 inches long, that has erect or ascending branches and is initially open but becomes contracted. Flower spikelets are 3, 8, or 10-flowered; the seed covering is indistinctly nerved, with a bristle half or less as long. This grass spreads by short rhizomes or by tillering, and it establishes quickly from seed compared to Kentucky bluegrass. Creeping Red Fescue is a economical cool season grass with a very fine texture and is good shade tolerant fescue. It is also a common component of many lawn mixes used in the Northern United States, and is prized for its performance in the dry, shady areas that dominate these places. Creeping red fescue will persist in sunny areas as well, and while it is the most popular fine-leafed fescue, it does not recuperate from traffic or heavy activity. Examples of Creeping Red Fescues that are useful for the invention include but are not limited to: Eugene Creeping Red Fescue, Weston Creeping Red Fescue, Crossbow (available from Columbia Seed LLC), Foxfire (available from Lesco) and Boreal Creeping Red Fescue. Custer Creeping Red Fescue Hard Fescue (*Festuca longifolia*) is indeed one of the "hardiest" of the fescues. Shade and drought resistant, and more disease resistant this fescue grows best in the north and the higher elevations and is more drought tolerant than chewings fescue. Hard fescue has blue-green color, and can grow in some of the most adverse of conditions including heavily shaded areas. Known for its clump formations, hard fescue may not be mown as low as the other fescues. Hard fescue is one grass that stays green a longer period of time, is slow growing and a low maintenance grass. Varieties of hard fescue are being developed for extended usage and acceptability as lawn grasses. This fescue makes good conservation, erosion, and reclamation planting option in areas not easily maintained, but still has adequate rainfall during the growing season. Typically Hard Fescues grown alone are characterized by: medium susceptibility to turfgrass diseases, low heat tolerance, not adapted to close mowing, low traffic tolerance, and salt tolerance. However, it does not recover well from severe injury and is not tolerant of high summer temperatures. Some examples of Hard Fescues that are useful for the invention include but are not limited to: Harpoon Hard Fescue, Gotham (available from Lesco) and Viking (available from Proseed Marketing, Inc.).

Chewings Fescue is an aggressive, bunch-type fine fescue that can in some cases overtake other grasses. Because of its high shade tolerance, it is sometimes used to overseed shady lawns, often in mixtures with perennial ryegrass. Generally, Chewings fescue is best adapted to cooler areas in the northern United States and Canada, the coastal regions of the Northeast and Pacific Northwest, and elsewhere where summers are cool. It is well adapted to the sandy, acidic, often infertile soils that are found in these regions. Chewings fescue resembles Tall Fescues in growth being more upright than creeping, yet still retaining the fine texture of the fine fescue group. The predominant use of chewings fescue is in the addition to other grass seed mixtures. One of the most popular is the mixture of perennial rye grass and chewings fescue. The adaptations of chewings improves the predominant grasses ability to better perform. Chewings Fescues have long been known for their fine leaf texture and to be among the most shade and drought tolerant of the cool season grasses. Chewings Fescues require less frequent mowing than ryegrass, tall fescue or Kentucky bluegrass, and perform well in low fertility areas such as golf course roughs. Non-limiting examples of chewings fescues useful for the invention include but are not limited to: Carmen Chewings Fescue and Carson Chewings Fescue.

Sheep Fescue (*Festuca ovina*) is generally described as a perennial graminoid. Native Sheep Fescue is a cool season, bunch grass adapted to central and northern latitudes of the U.S. This blue-green colored grass likes moist soils and does well in sandy or gravel soil types. It can be used as a cover crop with other native grass and wildflower plantings, erosion control, landscaping, or high elevation pasture. The Sheep Fescue has a relatively long life span and a moderate growth rate. Sheep Fescue is generally widely adapted to well-drained, medium-textured silt, silt loam, and loamy soils in the 10-18 inch rainfall zone of the Pacific Northwest. It is similar to Idaho fescue in drought resistance and more drought hardy than hard or chewings fescue. It has some shade tolerance.

Fine Fescues include creeping red, chewings, hard, and sheep fescue. All fine-leaf fescues are bunch-type grasses except creeping red fescue which is rhizomatous. Fine fescues are some of the most fine-textured turfgrasses available. Due to their good shade tolerance and ability to recuperate from stresses, fine fescues are often mixed with tall fescue to enhance performance in shady areas. Some of the cultivar names for Fine Fescues that may be used for this invention include: Ambassador, Berkshire, Cardinal, Class One, Compass, D P, Edgewood, Firefly, Fortitude, Garnet, Gotham, Jasper II, Musica, Oxford, Pathfinder, Predator, Quatro, Razor, Reliant IV, Scaldis, Spartan II, Seabreeze and Zodiac.

Similarly, varieties other than those described or exemplified herein may be used.

Seeding and Installation

The best time to install grass depends on the region and other factors. In the Northeast, early fall is typically the best time to plant grass, from the fourth week in August to the first week in October. In October, a nesting of the seed under ¼ inch of organic compost may be helpful. In other sections of the country, it may be better to wait until soil temperature is between 70° to 50° F. in the fall, or the beginning of the rainy season. Fall is the best, but it is possible to plant in the spring. For spring planting, research shows that grass seed sprouts best when the ground temperature is between 50°-70° F., which varies by location but is usually from the 4th week in April up until the second or third week in May in the Northeast for relatively sunny lawns (for shady lawns until about early June). Soil temperature is usually determined by placing a soil thermometer in the ground to measure 3 inches down.

There is no need to completely remove old lawn to install the lawn seed mixture of the invention. It is preferable to cut the existing old lawn very short, just about down to the soil (with a lawn mower blade to help stress out and get rid of the old grass). This may be done in one, or several, quick cut(s) on the same day, down close to the soil. The clippings should be raked away before spreading the seed mixture and water. More detailed installation instructions are provided in Example 5.

The lawn seed mixtures provided herein can be planted in a defined area of land without concerns of it spreading into surrounding areas. In some cases, to keep rain from moving the seeds down a slope before they become established, the seeds may be rolled into the soil with an empty roller and may be lightly raked into the soil or hydro seeded to stick the seeds in place.

To install lawn using the seed mixtures described herein over an existing lawn and weeds, the lawn and weeds should be first mowed extremely short down close to the soil, and using a dull mower blade to stress out the existing lawn and weeds. These clippings should be raked away so as to ruff up the soil, to avoid re-seeding weeds and to have good seed to soil contact). In some embodiments, the lawn then may be over-seeded heavily (e.g., 7-8 pounds of seed per 1,000 square feet). Watering in the morning every day if it does not rain for the first month will help the grass come in thickly. Weeds are usually an indicator of compacted and or acidic and poor soil conditions, so doing a soil test to see if the lawn needs lime, nutrients or aerating may be helpful. Applying ¼ to ½ inch of screened organic compost before seeding will be very helpful in lessening weeds.

It is often desirable to install a new lawn after the area is cleared of existing vegetation. Any suitable technique may be used to clear existing vegetation prior to seeding a new lawn as aspects of the invention are not limited in this respect.

Proper amounts of a lawn seed mixture for a particular parcel of land may vary but generally the same amount of the seed mixture can be used for all applications, such as new lawns, over-seeding existing lawns, to thicken an existing lawn or patch up old holes or damage in a lawn. In some embodiments, a seed mixture should be spread at about 15-20 seeds per inch (this roughly correspond to a 5 pound bag for every 1,000 square feet) for shady areas. In some embodiments, a more concentrated application at about 25-30 seeds per inch (7-8 pounds seed per 1,000 square feet) may be used in sunny areas to help out-compete weeds. The time it takes for an existing lawn to transition to a lawn composed of the seed mixture of the invention will vary.

Until the lawn is established following installation, watering is important. For instance, a new lawn may be started when the soil is observed moist all day but does not have puddles overnight that may create mold. The following is a general guideline for watering schedule after installation of the lawn seed mixture. In most sunny soil, 30 minutes of watering in the very early morning and optionally once more at 3 pm in the afternoon if it is very hot is recommended. Most shady lawns require 20 minutes of water in the morning. It typically takes 1-2 weeks to sprout. After 3 weeks of sprouting, a transition to once per day watering, then for the next two to three weeks, watering every other day may be useful. In very hot weather, a lawn may be watered deeply about once a week with an inch of water to help encourage deep roots. Once established in the first year, do not water frequently, water infrequently but deeply during droughts or periods of extreme heat. After the first year watering the lawn is seldom needed (only once a week during drought) or one may never need to water again if the lawn is allowed to go dormant. It will green up again with rain.

As described herein, the lawn seed mixtures described in the present application were selected for certain characteristics to support low maintenance care. The grass seeds blended as provided herein make it possible for the particular varieties of grass species to synergistically support the slow growth rate coupled with deep roots. As such, the lawn requires significantly less mowing.

Tests show that lawns generated from the mixtures described herein grow at a fraction of the rate relative to typical turf grass species grown in equivalent conditions. Generally, it is preferable to let the lawn grow to approximately 4+ inches tall before cutting back to about 3 inches, and that only ⅓ of the height of the grass is mowed at any one time. In most situations, this means mowing once a month in the summer or less. If allowed to grow higher, the grass will only reach a length of about 9 inches before going to seed and reseeding itself, but again, it will fall over after about 4 or 5 inches tall to make a 3-4 inch high meadow.

The low maintenance lawns described herein can be established effectively for insect and weed management in an environmentally friendly manner. It is easy to control crab grass and other weeds using the lawn seed mixtures of the invention. Generally it is preferable to establish a thick lawn in the fall, when weed seeds are dormant, and improving soil health by spreading screened organic compost is the best defense for a safe and effective lawn care with optional core aeration. For spring planting, if the seed mixture is planted around the second week of April, a thick and healthy lawn of 3.5 inches to 4 inches tall is likely to grow by mid-June. This helps to naturally shade out the weed seeds in the soil. Weeds and crab grass don't sprout until the soil warms up to 70 degrees, and as such most weeds do not have a chance to get started in a dense and tall lawn. If seeding is carried out in the spring, top-spread corn gluten (a natural broad weed killer) in the early spring may be helpful. Lawn seeds should not be planted at least four weeks after spreading corn gluten.

Packaging and Storage

In some embodiments, the lawn seed mixtures of the invention may be made available in a premeasured and pre-sealed package. In some embodiments, a seed package may weigh 1-50 pounds, e.g., 1 lb., 2.5 lb., 5 lb., 10 lb., 15 lb., 20 lb., 25 lb., 30 lb., 40 lb., or about 50 lb. However, smaller or larger packages may be used. In some embodiments, a package sold in the United States contains a label according to the USDA regulations that specifies the seed varieties and contents, as well as the origin of the seed varieties (e.g., grown in Oregon, etc.). Inert matter and other impurities such as other seeds (e.g., contaminants) also may be indicated, as for example in the United States.

In some embodiments, a seed mixture may be packaged for shipment, distribution, marketing and storage purposes. The invention does not limit the type of packaging material. Any materials of any size suitable for containing dry loose seed mixtures may be used. These include, but are not limited to: plastic and other polymers, cloth (natural and synthetic fibers), metal, wood, paper, etc., or any combination thereof. Various types of containers may be used, such as a bag, a box, a tab, a silo, a crate, a pail, a barrel, etc. In some embodiments, loose seed mixtures may be made available. In any case, the specific seed varieties of the mixture should be well blended to achieve even distribution of the specific proportions of the seed species in the mixture. It should be appreciated that seed mixtures described herein may be packaged alone or in combination with one or more additional seeds and/or other material (e.g., fertilizer, soil, compost, binding material, etc., or any combination thereof).

The lawn seed mixtures of the invention may be stored for later use. The seed mixtures should be stored in a cool dry space inside a container, such as plastic or metal container. If stored properly, the seed mixture will remain optimally effective for about 18 months after harvesting or for several years at a lower sprouting rate. Storing it where it may be exposed to extreme heat or freezing should be avoided. For example, seed mixtures may be stored over the winter. Proper temperature for storage ranges between above 40 degrees and below 90 degrees. While it is best to be used within 18 months after harvesting, it can be used after that, but may have a lower sprouting rate. Unopened bags of seed mixtures may be stored as is. If opened, excess air should be squeezed out and the bag should be sealed up. Whether used for over-seeding to existing lawn in the early spring or for starting a nascent lawn, properly stored seed mixtures will be ready for use in the spring. The seed mixtures should be kept from freezing by storing them in a cool location such as dry basement.

Uses/Applications

The lawn seed mixtures described in the present application offer a wide range of applications, including landscaping, green roofs, and other functional and/or aesthetic uses. Generally, they can be used for anywhere natural turf is desired, climate and other conditions permitted. Examples of applications include, without limitation, residential and non-residential garden and yard (e.g., front yard, backyard, side yard) a field (e.g., a town field and school yard), a golf course, a park, a condominium, cemetery, and municipal, state and interstate greenery (e.g., greenbelt and greenways), etc.

For use for public greenery such as greenways alongside highways, the lawn seed mixtures of the present invention are particularly suited due to their requirement for low maintenance. For example, the low maintenance lawn of the present invention may be installed on the edge of highways between the guard rail and the road edge for about 6 feet on either side of the guard rail to help the guard rail exposed with minimal care, which reduces costs. It is especially crucial to keep the grass along the edge of highways quite short for safety purposes.

Every year, the maintenance of greenery alongside public roads and highways incurs significant costs to tax payers. The low maintenance lawn of the instant invention offers a cost-effective, aesthetically pleasing, and environmentally beneficial means of providing greenery to public roads and highways, as well as other infrastructure. Tests are being conducted to further evaluate areas for sunny and shady, good soil and poor soils, and slopes. A wide range of additional experiments are currently being performed to evaluate the importance of aerating, composting, dethatching, as well as numerous levels of soil amendments from adjusting pH, microbial level and nitrogen, etc., or any combination thereof.

In addition to dry blends of lawn seeds per se, the invention also contemplates some of the lawn seed mixtures that are pre-seeded into a desired soil mixture such that the pre-seeded soil mixture is germination-ready.

In some embodiments, the lawn seed mixtures may further comprise one or more additional components. For example, flower seeds may be blended in the lawn seed mixture of the invention. Particularly suitable types of flower seeds include wild flowers.

In some embodiments, the lawn seed mixtures may be made available as part of a kit. The kit may include one or more lawn seed mixtures described in the present application, a soil mixture and/or an organic fertilizer or compost mix. In some embodiments, the kit also contains instructions for planting and lawn care.

In some cases, a pre-grown turf may be made from the lawn seed mixtures described herein which can then be transported to a location where a lawn is to be established. The pre-grown turf may be grown in or cut into strips then be rolled up for easy shipping or transport.

The lawn seed mixtures of the present disclosure produce environmentally friendly lawn therefore are suitable for use to improve local environment while maintaining esthetically pleasing greenery. Research from the Massachusetts Department of Environmental Protection shows that lawn care chemical can increase the risk of learning and behavioral disorders for children, Parkinson's Disease for adults, cancer rates, and other health problems. It is therefore desirable to limit their exposure to chemical fertilizers. The present invention provides healthier alternatives for establishing and maintaining aesthetically pleasing green lawn that is also safe for young children, animals and older people. Making a chemical-free lawn is not only better for the health of those who come in contact, but also beneficial for the environment. Indeed, lawn grown as described in the present application will require no chemicals to pollute watershed, and less mowing means less carbon, to pollute our air.

The lawn seed mixtures described herein require no artificial or genetically modified seeds. As mentioned herein, initial selections were carried out using grass seeds that are either native to or adapted to the New England climate. Subsequently, the mixtures were tested for further climate variations for adapting to other regions. Thus, the seed mixtures described herein require no chemical fertilizer and therefore are natural, safe and healthy for children and animals to play on.

Blue grass cut one inch high produces as much carbon as oxygen in 24 hours. By comparison, the low maintenance lawn described in the present disclosure, when cut 3 inches high, produces 5,760 times the oxygen compared to carbon in 24 hours. This is an oxygen producing carbon sink, which contributes to benefit the environment.

It should be noted that certain lawn seed mixtures and the lawn described herein are not suitable for forage. In some embodiments, lawns of the invention would not be safe for grazing herd such as horses, goats, sheep and cows since the seed blend is naturally endophytes-enhanced (to keep away bugs) which might cause stomach distress in horses, cows, goats and deer, all animals whose main diet is the grass. The lawn should not be a problem for pets such as dogs and cats, that only nibble on the grass.

The following examples provide non-limiting embodiments of the invention and are not intended to limit the scope of the invention in any way.

EXAMPLES

Example 1

Sunny Mixture—Original

The following blend of seeds is particularly suitable for generally sunny locations, such as areas of land with approximately 50% to full sun.

| Pure seed (% by weight) | Description | Germination (Min. %) | Grown in: |
|---|---|---|---|
| 19.75 | Dakota Tall Fescue | 92 | Oregon |
| 19.75 | Frontier Perennial Ryegrass | 92 | Oregon |
| 19.65 | Deepblue Kentucky Bluegrass | 88 | Washington |
| 19.65 | Harpoon Hard Fescue | 90 | Oregon |
| 19.65 | Carmen Chewings Fescue | 90 | Oregon |
| 1.47 | Inert Matter | | |
| 0.05 | Other Crop Seed | | |
| 0.03 | Weed Seed | | |
| (Total 100.0) | | | |

Example 2

Sunny Mixture—Second Generation

The following blend of seeds is suitable for generally sunny locations, such as areas of land with approximately 50% to full sun. This is particularly heat- and sun-tolerant.

| Pure seed (% by weight) | Description | Germination (Min. %) | Grown in: |
|---|---|---|---|
| 23.75 | Dakota Tall Fescue | 92 | Oregon |
| 17.75 | Frontier Perennial Ryegrass | 92 | Oregon |
| 17.65 | Deepblue Kentucky Bluegrass | 88 | Washington |
| 14.65 | Harpoon Hard Fescue | 90 | Oregon |
| 12.65 | Weston Creeping Red Fescue | 85 | Oregon |
| 12.00 | Carmen Chewings Fescue | 90 | Oregon |
| Less than 1.5 | Inert Matter | | |
| Less than 0.05 | Other Crop Seed | | |
| Less than 0.03 | Weed Seed | | |

(Total 100.0)

Example 3

Shady Mixture—Original

The following blend of seeds is suited for fully shady locations as well as part-sun locations (e.g., up to about 50% sun).

| Pure seed (% by weight) | Description | Germination (Min. %) | Grown in: |
|---|---|---|---|
| 24.55 | Eugene Creeping Red Fescue | 90 | Canada |
| 24.55 | Weston Creeping Red Rescue | 90 | Oregon |
| 19.65 | Harpoon Hard Fescue | 90 | Oregon |
| 14.75 | Carmen Chewings Fescue | 90 | Oregon |
| 14.75 | Sheep Fescue | 90 | Canada |
| Less than 1.7 | Inert Matter | | |
| Less than 0.05 | Other Crop Seed | | |
| Less than 0.03 | Weed Seed | | |

(Total 100.0)

Example 4

Shady Mixture—Second Generation

The following is a non-limiting embodiment of a seed blend that is suited for fully shady locations as well as part-sun locations (e.g., up to about 50% sun). This mixture is particularly suitable for sub-optimal soil conditions, warm climate and/or areas susceptible for heavy wear.

| Pure seed (% by weight) | Description | Germination (Min. %) | Grown in: |
|---|---|---|---|
| 22.55 | Eugene Creeping Red Fescue | 90 | Canada |
| 22.55 | Harpoon Hard Fescue | 90 | Oregon |
| 18.65 | Weston Creeping Red Rescue | 90 | Oregon |
| 15.75 | Sheep Fescue | 90 | Canada |
| 11.75 | Carmen Chewings Fescue | 90 | Oregon |
| 7.55 | Other Fine Fescue(s) | 85 | Oregon |
| Less than 1.5 | Inert Matter | | |
| Less than 0.05 | Other Crop Seed | | |
| Less than 0.03 | Weed Seed | | |

(Total 100.0)

Example 5

Planting Procedure

The seed mixtures described herein can be used for overseeding atop an existing lawn or for installing a new lawn. Best planting time will vary from region to region, but generally it is best to plant when the soil temperature is between 50 and 70 degrees. For example, for planting in New England, it is preferred to wait until about first week of September, or until the soil temperature goes down to about 70 degrees.

It should be noted that watering/cutting details are extremely important to promote robust growth of the lawn. Briefly, prior to applying the seed mixtures of the invention, any existing lawn should be cut extremely and brutally short right down to the dirt with a dull blade. Clippings and thatch should be raked away. Proper amounts of the seed mixtures are then spread (see below for more detail) in the desired area. For the first month or so, the planted area should be watered in the morning. Once lawn is established, the lawn may not require much watering if cut 3-4 inches high and always with a sharp lawn mower blade.

Detailed Installation Instructions for the ultimate green lawn are provided below.

1. CUT lawn/weeds as low as possible, to one inch or less, to help kill off existing growth.

2. REMOVE THATCH. Fall only: STEEL RAKE deeply (or rent dethatcher for big lawns) to loosen old clippings, thatch, sticks, and above ground roots. In spring, only rake surface (do not deep dethatch) to avoid bringing up weed seeds to the surface.

3. SURFACE RAKE again with yard rake to take away loosened clippings, stones and thatch.

4. LIME TO MAKE SOIL LESS ACIDIC: Test soil to find the right amount of lime to bring soil between 6 and 7 pH or just use a simple rule of thumb of top spreading one 40 pound bag of pellet lime for every 1000 sq feet of lawn to make pH more neutral and lessen weeds, as well.

5. CORE-AERATE by punching holes, to bring air and water to the roots and lessen compaction of the soil. For most lawns do this once (or twice) per year for compacted/clay soil lawns or lawns that do not drain well. Once you have stopped using chemical fertilizer/products and soil has rebuilt up healthy microbes, aeration is not as necessary and may be done once every two years. Rent a self propelled core aerator (not spike aerator) that pulls up finger size soil plugs onto your lawn that melt away naturally. It is helpful to water the night before you aerate to moisten the lawn. Scientific evidence suggests aeration and cutting tall with a sharp blade makes a measurable difference in the long term health, quality and look of the lawn. An aerated lawn favors grass and lessens weeds. A compacted lawn favors weeds.

6. FOR SEED STARTER: Spread small amount of organic compost, ¼ inch layer which equals ¾ cu. yard for every 1,000 sq ft to help start seeds. This fertilizes your lawn for a year and helps keep out future weeds and grubs. Don't use chemical fertilizer to lessen health and environmental risks.

7. SPREAD A SEED MIXTURE at 15/sq in (5 # bag does 1000 sq ft) or spread extra thick at 25 seeds per square inch or 7-8 pounds/1000 sq feet to help keep out weeds. Apply with a spreader going in two directions at right angles to each other for even spread. Gently rake into soil to just barely be covered.

8. ROLL SEEDS INTO DIRT with an empty to ¼-full roller (no more water than ¼ to not compact soil). Rolling seeds in for good soil contact is especially important if you have any kind of slope to prevent erosion or HYDRO-SEED sloped lawns, with tacaifier (a glue like mixture) added to HYDRO-SEED to stick seeds in place until germination occurs.

9. WATERING: Water every day (if it does not rain) for 3 weeks in the early morning for 20/30 minutes or what ever length of time that helps it be moist down to one inch. Set up an automatic timer if you cannot do it regularly. In warmer weather or for well-drained soil, water a second time for 20 minutes at about 3 pm. Never water after 5 pm in the evening to prevent fungal disease. After 3 weeks, cut back to watering every 2 days, for the next 2 weeks. Adjust watering timing and length of time for your soil to stay moist but not have puddles overnight. If you seed in the spring, during the first year only, after the first month of watering, in August (or during drought) water one inch, once per week, in the morning. If you seed in the fall, after one month of watering you are done with watering. Watering to get established is essential.

10. MOWING: Cut your lawn high with a sharp blade (to not damage the grass). Wait until new grass is 4 inches tall, to cut back to 3+ inches tall. Leave the clippings only if you use a mulching mower. After that initial cut, cut once in June, once in July, optionally once in August (only if it needs it) and once in September. If you never cut it, a lawn grown from a mixture described herein (e.g., a shade mix) leans over and turns into a 4" high meadow. Mow fall leaves into lawn or rake or blow away so leaves never stay more than one week on grass.

11. NEXT SEEDING SEASON, (Mid April or beginning September), cut with sharp blade when lawn is dry in stages, ⅓ of grass height at a time, cutting back to 1" tall; rake away clippings, and over-seed at the same rate or heavier rate to later shade the soil and prevent weeds from starting in June. This second seeding (over-seeding) is very important to help out-compete weeds, cover any bald patches and correct erosion/damage and thicken the lawn. Water for a month (same as above), over-seeding to thicken lawn.

12. FOR WEED CONTROL: A thick, healthy lawn, cut with a sharp blade 3+ inch tall, that was aerated, with proper pH and a ¼" of top-spread organic compost has few weeds. For the first year, lower expectations and expect some weeds or to get rid of them, aerate 2× per year, cut 3+ inches high with a sharp blade and heavily over-seed (8 pounds per 1,000 sq ft with a mixture described herein) to help out-compete weeds. Then spread corn gluten in the first week of April to selectively prevent broadleaf weeds, along with some optional hand pulling to control weeds. Over-seed again a month later.

EQUIVALENTS

The foregoing written specification is considered to be sufficient to enable one skilled in the art to practice the invention. The present invention is not to be limited in scope by examples provided, since the examples are intended as a single illustration of one aspect of the invention and other functionally equivalent embodiments are within the scope of the invention. Various modifications of the invention in addition to those shown and described herein will become apparent to those skilled in the art from the foregoing description and fall within the scope of the appended claims. The advantages and objects of the invention are not necessarily encompassed by each embodiment of the invention.

What is claimed is:

1. A premeasured lawn seed mixture comprising the following percentage ranges of seeds:
   (a) 18-22% Tall Fescue;
   (b) 18-22% Perennial Ryegrass;
   (c) 18-22% Kentucky Bluegrass;
   (d) 18-22% Hard Fescue; and
   (e) 18-22% Chewings Fescue.

2. The lawn seed mixture of claim 1, wherein the seeds are present within the following percentage ranges:
   (a) 19-21% Tall Fescue;
   (b) 19-21% Perennial Ryegrass;
   (c) 19-21% Kentucky Bluegrass;
   (d) 19-21% Hard Fescue; and
   (e) 19-21% Chewings Fescue.

3. The lawn seed mixture of claim 2, comprising about:
   (a) 19.75% Tall Fescue;
   (b) 19.75% Perennial Ryegrass;
   (c) 19.65% Kentucky Bluegrass;
   (d) 19.65% Hard Fescue;
   (e) 19.65% Chewings Fescue;
   (f) 1.47% inert matter;
   (g) 0.05% other crop seed; and
   (h) 0.03% weed seed.

4. The seed mixture of claim 1, wherein at least one additional seed type is included.

5. The seed mixture of claim 1, wherein the seed mixture is contained in a bag.

6. The seed mixture of claim 1, further comprising an organic fertilizer.

7. The seed mixture of claim 1, further comprising composting material.

8. A method for increasing resistance of a lawn to drought, or heat, or sun, or shade, or salt, the method comprising planting a lawn seed mixture according to claim 1.

9. A method for enhancing root growth of a lawn, the method comprising planting a lawn seed mixture according to claim 1.

10. A method for reducing lawn care, the method comprising planting a lawn seed mixture according to claim 1.

11. The method of claim 10 wherein the lawn care comprises a chemical applied to the lawn.

12. The method of claim 11 wherein the chemical is a chemical fertilizer.

13. The method of claim 11 wherein the chemical is a chemical pesticide or insecticide.

14. The method of claim 10 wherein the lawn care comprises watering.

15. The method of claim 10 wherein the lawn care comprises mowing.

* * * * *